March 31, 1964     M. WIESSNER ET AL     3,126,804
ATTACHABLE MOTOR-WINDING APPARATUS FOR PHOTOGRAPHIC CAMERAS
Filed May 4, 1961
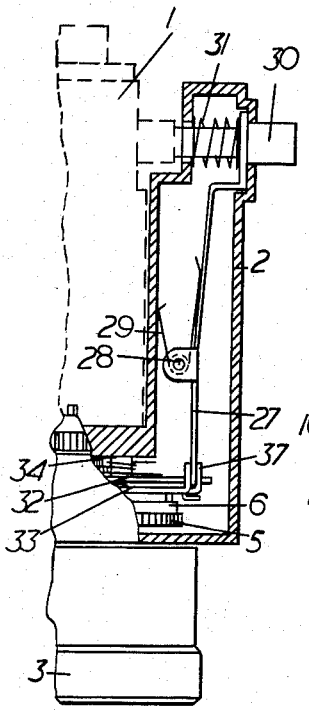
FIG. 2.
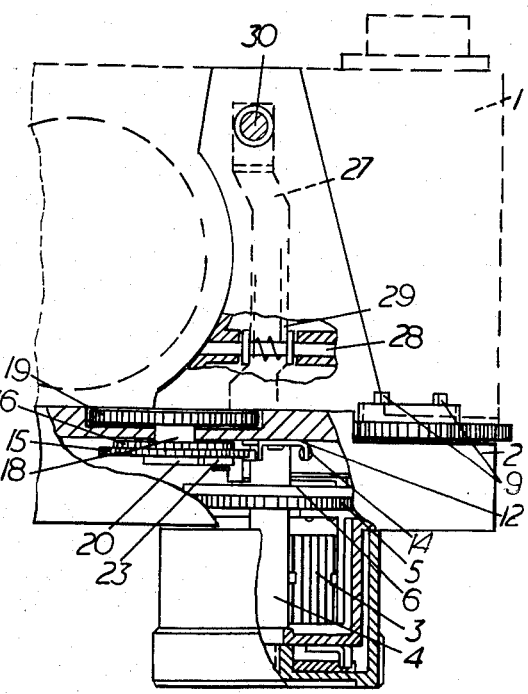
FIG. 1.
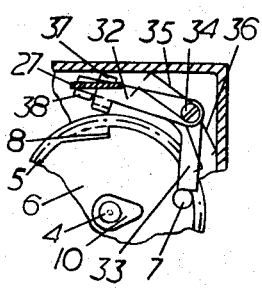
FIG. 4.
FIG. 3.
Inventors
MANFRED WIESSNER
HEINRICH SKOLAUDE
By Irwin S. Thompson
Attorney

United States Patent Office 3,126,804
Patented Mar. 31, 1964

3,126,804
ATTACHABLE MOTOR-WINDING APPARATUS FOR PHOTOGRAPHIC CAMERAS
Manfred Wiessner, Dresden, and Heinrich Skolaude, Freital, Saxony, Germany, assignors to VEB Kamera- und Kinowerke Dresden, Dresden, Germany
Filed May 4, 1961, Ser. No. 107,803
5 Claims. (Cl. 95—31)

The invention relates to a motor winding arrangement attachable to photographic cameras, which is connected with the release arrangement of the camera and after the running off of the shutter provided for the exposure especially effects the common cocking of the shutter and the winding of the film coupled therewith. Such attachable motor winding arrangements, wherein a spring motor or an electric motor serves as power source, are already known per se in various constructions. The motor winding arrangement is here as a rule constructed as additional apparatus to the camera and so arranged that it is couplable either with the common cocking gearing for the shutter and the film winding coupled therewith or directely with the film winding arrangement of the camera.

This coupling connection on the other hand however has the disadvantage that when the end of the film is reached uncoupling between the motor winding arrangement and the camera does not take place, so that if this remains un-noticed, the film situated in the camera is torn away from the spool core of the supply spool. Not only does this cause the disadvantage that winding back of the exposed film is no longer possible, but it can also result in gear disturbances both for the camera and for the motor winding arrangement. These disturbances also cannot be avoided by the arrangement, known per se, of a picture-counting mechanism installed in the camera, for this in fact shows the number of pictures taken, but it does not at the same time prevent further release of the camera and the motor winding arrangement when the prescribed number of pictures is reached.

The invention has the aim of avoiding the stated disadvantages. This is achieved essentially due to the fact that with the motor winding arrangement attachable to the camera there is associated its own picture-counting disc with shift wheel and shift disc, the shift wheel cooperating with a shift member controlled by the motor winding arrangement and the shift disc blocking the common release arrangement for the camera and the motor winding arrangement, through a blocking lever when the zero position is reached, and due to the fact that this release arrangement also has a pair of blocking levers controlled by it, which pair of levers, through a blocking disc connected with the motor winding arrangement, alternately blocks and releases its rotation.

This construction in accordance with the invention achieves the object that the picture-counting disc set for example to the taking of 36 pictures in the case of the use of standard film automatically blocks the common release arrangement for the camera and the motor winding by means of its operating disc through a blocking lever, after this picture number is reached, which is marked by a zero position. Thus at this zero position release neither of the camera nor of the motor winding arrangement is possible. Thus in reliable manner the tearing of the film and the disturbances of the gearing thereby possible are prevented. Furthermore however in this zero position the lever pair controllable by the release arrangement also simultaneously blocks the rotation of the motor winding arrangement, so that the latter also cannot be switched on independently. Thus a double security against incorrect release is provided, in that both the release arrangement for the camera and the motor winding arrangement, also the actual rotation thereof, are blocked.

While where standard films are used the construction of the picture-counting disc for a setting up to 36 pictures is adequate, the arrangement in accordance with the invention is also intended to render possible the use of motor winding arrangement where cameras are used with film cassettes attachable thereto which are arranged for large film lengths, for example up to 17 m., producing about 400 standard pictures. Here the disadvantage would arise that where a picture-counting disc is provided which is arranged for normal films for 36 pictures, after the taking of this number of pictures the release arrangement is blocked in each case, so that the picture-counting disc would have to be set afresh each time to a picture number, in order to render further exposures possible.

This disadvantage is avoided, in further development of the invention, due to the fact that the settable picture-counting disc has an additional setting mark, preferably characterised by "K" for the use of cassettes, and in the case of this setting the winding of the picture-counting disc actuated by the motor winding arrangement is interrupted. In this set position at the same time the blocking lever for the release arrangement of the camera and the motor winding arrangement is disengaged, but on the other hand the alternate blocking and release of the rotation of the motor winding arrangement, controlled by the release arrangement, remains in existence. This advantageous style of working is achieved in accordance with the invention due to the fact that when the picture-counting disc is set to "K" or for the use of cassettes, a tooth interruption is provided in the shift wheel of the picture-counting disc in such fashion that in the case of "K" setting the shift member controlled by the motor winding arrangement cannot effect a shift movement of the shift wheel and thus of the picture-counting disc. Thus it is rendered possible that the motor winding arrangement according to the invention is usable both for cameras with standard film and also for cameras with film cassette for large film lengths and here only the picture-counting disc has to be set to the use of these different film lengths.

In the following description and the drawings an example of embodiment of a motor winding arrangement according to the invention attachable to a photographic camera is explained and described, from which at the same further features thereof appear. Here the representation of all details and parts which do not appear necessary for the understanding of the invention has been omitted.

FIGURE 1 shows in diagrammatic representation a broken-away part of a spring motor winding arrangement according to the invention, seen from the back and partly in section, with a photographic camera which is indicated in chain lines;

FIGURE 2 shows a lateral elevation with partial section of the representation as shown in FIGURE 1;

FIGURE 3 shows a plan view with partial section of the representation as shown in FIGURE 1;

FIGURE 4 shows a detail of FIGURE 3.

According to FIGURES 1–3, with the photographic camera 1 indicated in chain lines there is connected the motor winding arrangement 2, preferably constructed as apparatus additional to the camera. It possesses a windable spring mechanism 3, with the spindle 4 of which there is connected a drive wheel 5 constructed as a toothed wheel, having a blocking disc 6 possessing a blocking pin 7 and a blocking catch 8. Through intermediate wheels (not shown) the drive wheel 5 drives the drive member 9 constructed as coupling part, which is couplable with the winding gearing, installed in the camera 1, for the shutter and film-winding. With the spindle 4 of the spring mechanism 3 there is also connected a dog 10 which on rotation of the motor winding arrangement 2 actuates the slider 12 movably guided by two pins 11, which slider possesses a spring pawl 13 and is urged by the spring 14 against the dog 10.

The slider 12 co-operates with its pawl 13 with a shift wheel 15, with which there is connected a blocking wheel 16 which by means of a blocking pawl 17 prevents the return movement of the shift wheel 15. With the shift wheel 15 there is connected, through a shaft 18 mounted in the motor housing, a picture-counting disc 19 on which apart from the picture numbers in the range for example from 1–36 there is provided a mark designated by "0" for the zero setting and a mark designated by "K" for the use of film cassettes. Furthermore the shift wheel 15 possesses on its lower side a shift disc 20, which has a catch recess 21. The shift wheel 15 with the blocking wheel 16, the shaft 18, the picture-counting disc 19 and the shift disc 20 forms a unitary structural part, which receives its rotatable mounting by the shaft 18 mounted in the motor housing. The arrangement is here made such that the picture-counting disc 19, as shown especially in FIGURE 1, lies counter-sunk in the upper cover plate of the motor housing and is milled on the periphery, so that the picture-counting disc 19 can be set from the exterior through a cut-away portion provided laterally on the motor housing.

With the shift disc 20 connected with the shift wheel 15 there co-operates a double-armed blocking lever 23 rotatable about the stationary pivot bolt 22. This blocking lever has at the end of one lever arm a blocking hook and its other lever arm is constructed as feeler 25, by means of which the blocking lever 23 can drop due to the action of a torsion spring 26 into the catch recess 21 of the shift disc 20. The blocking lever 23 co-operates by means of its blocking hook with the lower end of the release lever 27, which is pivotable about the mounting 28 fast with the housing and is subject to the action of a torsion spring 29. The release lever 27 is connected at its upper end with the release knob 30 of the camera 1, which is moved back into the initial position in each case due to the action of the compression spring 31.

The release lever 27 in its movement actuates the two blocking levers 32, 33, which are arranged one above the other for movement about the stationary pivot bolt 34 and are subject to the action of springs 35, 36. The upper blocking lever 32 engages due to the action of the spring 35 with the catch 8 of the blocking disc 6 and thereby prevents the running off of the winding gearing driven by the spring mechanism 3. The upper blocking lever 32 is also provided with an upwardly bent lug 37, which extends into the range of movement of the release lever 27. The lower blocking lever 33, constructed as bell-crank lever, rests by means of a bent-over lug 38 on the upper blocking lever 32 due to the action of the spring 36.

On release of the camera by actuation of the release knob 30 the release lever 27 connected therewith moves the upper blocking lever 32 out of the blocking position, thereby releasing the blocking disc 6 which rotates under the influence of the spring mechanism 3 and thus the running off of the winding gearing. In this release movement the lower bell-crank lever 33 follows the upper blocking lever 32 due to the action of the spring 36, this bell-crank lever coming with its lower lever arm into the range of rotation of the blocking pin 7 mounted on the blocking disc 6. Thus after a short partial revolution the winding movement is blocked again and the upper blocking lever 32 cannot return into the blocking catch 8 of the blocking disc 6. In the return movement of the release lever 27 the latter on the one hand moves the bell-crank lever 33 out of the blocking position and on the other hand it releases the upper blocking lever 32 for return into the blocking position, which lever then drops due to the action of the spring 35, after the running off of a full revolution of the winding gearing, into the blocking catch 8 of the shift disc 6, and thus blocks a further rotational movement of the winding gearing. During this rotation the slider 12 is moved by the dog 10 by one shift step, the slider thereby conveying the shift wheel 15 with the picture-counting disc 19 connected therewith further by one picture number by means of its spring pawl 13. Here a return movement of the shift disc 15 is prevented by the blocking pawl 17 engaging in the blocking wheel 16.

After the running off of the number of the pictures to be taken on the film, set by means of the picture-counting disc 19, this disc reaches the zero position marked by "0." Here the arm 25 of the blocking lever 23 can drop due to the action of its spring 26 into the catch recess 21 of the shift disc 20 and its blocking hook moves into the path of the release lever 27, whereby the release movement thereof is blocked. Thus in this zero position no release of the camera and of the motor winding arrangement can take place, the rotation of which latter is also prevented by the blocking lever 32 engaging in the catch 8 of the shift disc 6, which lever is connected with the release lever 27. Thus a double blocking securing arrangement is achieved.

Following fresh setting of the picture-counting disc 19 the shift disc 20 connected therewith, through its catch recess 21 moves the blocking lever 23 by way of the feeler arm 25 out of the blocking position at the same time, and thus the release movement of the release lever 27 is again freed. The camera 1 and the motor winding arrangement 2 can then again be released alternately by actuation of the release knob 30.

In order also to render possible the use of the camera with film cassettes for a large quantity of film, for which for example the picture-counting disc adapted to 36 picture exposures is not sufficient, in further development of the invention the picture-counting arrangement is disengageable from the motor winding arrangement. This setting for the use of film cassettes of large film length is achieved by a setting mark designated by "K" additionally provided on the picture-counting disc 19. In conjunction with the setting mark "K" there is provided a gap 39 in the teeth on the shift wheel 15. When the picture-counting disc 19 is set to the setting mark "K" the gap 39 provided on the shift wheel 15 lies in the range of movement of the spring pawl 13 of the slider 12, so that in its shift movement no conveying of the shift wheel 15 and of the picture-counting disc 19 connected therewith can take place. Nevertheless the blocking and release of the motor winding gearing, controlled alternately by the release lever 27 through the blocking levers 32, 33 is still effective, so that both the shutter-cocking and also the step-by-step winding of the film are ensured in reliable fashion.

We claim:

1. In a photographic camera having a housing, a shutter device mounted in the housing, a depressable shutter release member operatively connected with the shutter device, and film winding mechanism within the housing, the provision of a first spindle mounted in the housing, a driving wheel mounted on said first spindle to rotate therewith and operatively connected to said film winding mechanism, a blocking disc rigidly mounted on said first spindle, windable spring means within said housing and connected to said first spindle for driving the latter, a catch member pivotally mounted within the housing and releasably engageable with said blocking disc to prevent rotation of the latter, a release lever pivotally mounted in the housing and connected to the release member, so as to be pivoted on the depression of said release member, said lever being cooperable with said catch member to effect rotation of the latter to release said blocking disc, a second spindle rotatable within the housing, a counting disc rotatably mounted on said second spindle and settable to a desired rotational position according to the length of film used, a toothed element connected with said counting disc, step-by-step driving means operatively connected between said first spindle and the counting disc for step-by-step rotation of the latter, a locking arm pivotally mounted in the housing and operatively couplable with the release member to prevent actuation thereof, and a control element connected with said counting disc for pivoting said locking arm to effect locking of the release member when the counting disc has reached a preselected rotational position, said toothed element having a gap where there are no teeth, whereby on rotation of said counting disc to a set position according to the use of long lengths of film, the gap is brought adjacent the step-by-step driving means and the counting disc remains stationary on continued actuation of said step-by-step driving means.

2. In a photographic camera having a housing, a shutter device mounted in the housing, a depressable shutter release member operatively connected with the shutter device, and film winding mechanism within the housing, the provision of a first spindle mounted in the housing, a driving wheel mounted on said first spindle to rotate therewith and operatively connected to said film winding mechanism, a blocking disc rigidly mounted on said first spindle, windable spring means within said housing and connected to said first spindle for driving the latter, a catch member pivotally mounted within the housing and releasably engageable with said blocking disc to prevent rotation of the latter, a release lever pivotally mounted in the housing and connected to the release member so as to be pivoted on the depression of said release member, said lever being cooperable with said catch member to effect rotation of the latter for the release of said blocking disc, a cam element rigidly mounted on the first spindle, a slider reciprocable by said cam element, spring means urging said slider into engagement with said cam element, a pawl provided on said slider, a second spindle rotatable within the housing, a counting disc rotatably mounted on said second spindle and settable to a desired rotational position according to the length of film used, a toothed element connected with said counting disc and engageable by said pawl for step-by-step rotation of the counting disc, a locking arm pivotally mounted in the housing and operatively couplable with the release member to prevent actuation thereof, and a control element connected with said counting disc for pivoting said locking arm to effect locking of the release member when the counting disc has reached a pre-selected rotational position, said toothed element having a gap on the periphery thereof where there are no teeth, whereby on rotation of said counting disc to a set position according to the use of long lengths of film, the gap is brought adjacent the pawl and the counting disc remains stationary on continued reciprocation of the slider.

3. In a photographic camera having a housing, a shutter device mounted in the housing, a depressable shutter release member operatively connected with the shutter device, and film winding mechanism within the housing, the provision of a first spindle mounted in the housing, a driving wheel mounted on said first spindle to rotate therewith and operatively connected to said film winding mechanism, a blocking disc rigidly mounted on said first spindle, windable spring means within said housing and connected to said first spindle for driving the latter, a first catch member pivotally mounted within the housing and releasably engageable with said blocking disc to prevent rotation of the latter, a release lever pivotally mounted in the housing and connected to the release member so as to be pivoted on the depression of said release member, said lever being cooperable with said first catch member to effect rotation of the latter for the release of said blocking disc, a projection on said blocking disc, a second catch member pivotally mounted within the housing, spring means for urging said second catch member into the path of said projection to prevent further rotation of the blocking disc after release thereof by said first catch member, a cam element rigidly mounted on the first spindle, a slider reciprocable by said cam element, spring means urging said slider into engagement with said cam element, a pawl provided on said slider, a second spindle rotatable within the housing, a counting disc rotatably mounted on said second spindle and settable to a desired rotational position according to the length of film used, a toothed element connected with said counting disc and engageable by said pawl for step-by-step rotation of the counting disc, a locking arm pivotally mounted in the housing and operatively couplable with the release member to prevent actuation thereof, and a control element connected with said counting disc for pivoting said locking arm to effect locking of the release member when the counting disc has reached a pre-selected rotational position, said toothed element having a gap on the periphery thereof where there are no teeth, whereby on rotation of said counting disc to a set position according to the use of long lengths of film, the gap is brought adjacent the pawl and the counting disc remains stationary on continued reciprocation of the slider.

4. In a photographic camera having a housing, a shutter device mounted in the housing, a spring loaded depressable shutter release member operatively connected with the shutter device and film winding mechanism within the housing, the provision of a first spindle mounted in the housing, a driving wheel mounted on said first spindle to rotate therewith and operatively connected to said film winding mechanism, a blocking disc rigidly mounted on said first spindle, windable spring means within said housing and connected to said first spindle for driving the latter, a pivot support in the housing, a first catch member pivotally mounted on said pivot support and releasably engageable with a recess in said blocking disc to prevent rotation of the latter, a first spring element urging said first catch member into engagement with said recess, a release lever pivotally mounted in the housing and connected to the release member so as to be pivoted on the depression of said release member, said lever being cooperable with said first catch member to effect rotation of the latter for the release of said blocking disc, a projection on said blocking disc, a second catch member in the form of a bell-crank lever pivotally mounted on said pivot support, a second spring element for urging one arm of said second catch member into the path of said projection to prevent further rotation of the blocking disc after release thereof by said first catch member, a first lug provided on said first catch means and engageable by said release lever on actuation thereof to move the first catch member out of engagement with the recess against the action of the first spring element, a second lug provided on the other arm of said second catch member and engageable with said first catch member to entrain the latter on return movement of the release lever, to urge said first catch member towards the blocking disc ready for engagement with said recess on completion of one revolution of said disc, a cam element rigidly mounted on the first spindle, a slider reciprocable by said cam element, spring means urging said slider into engagement with said cam element, a pawl provided on said slider, a second spindle rotatable within the housing, a counting disc rotatably mounted on said second spindle and settable to a desired rotational position according to the length of film used, a toothed element connected with said counting disc and engageable by said pawl for step-by-step rotation of the counting disc, a locking arm pivotally mounted in the housing and operatively couplable with the release member to prevent actuation thereof, and a control element connected with said counting disc for pivoting said locking arm to effect locking of the release member when the counting disc has reached a preselected rotational position, said toothed element having a gap on the periphery thereof where there are no teeth, whereby on rotation of said counting disc to a set position according to the use of long lengths of film, the gap is brought adjacent the pawl and the counting disc remains stationary on continued reciprocation of the slider.

5. In a photographic camera having a housing, a shutter device mounted in the housing, a depressable shutter release member operatively connected with the shutter device, and film winding mechanism within the housing, the provision of a first spindle mounted in the housing, a driving wheel mounted on said first spindle to rotate therewith and operatively connected to said film winding mechanism, a blocking disc rigidly mounted on said first spindle, windable spring means within said housing and connected to said first spindle for driving the latter, a first catch member pivotally mounted within the housing and releasably engageable with said blocking disc to prevent rotation of the latter, a release lever pivotally mounted in the housing and connected to the release member so as to be pivoted on the depression of said release member, said lever being cooperable with said first catch member to effect rotation of the latter for the release of said blocking disc, a cam element rigidly mounted on the first spindle, a slider reciprocable by said cam element, spring means urging said slider into engagement with said cam element, a pawl provided on said slider, a second spindle rotatable within the housing, a counting disc rotatably mounted on said second spindle and settable to a desired rotational position according to the length of film used, said counting disc being located within a recess provided on the housing and accessible through an opening in the housing for the purposes of setting the disc, a toothed element connected with said counting disc and engageable by said pawl for step-by-step rotation of the counting disc, a locking arm pivotally mounted in the housing and operatively couplable with the release member to prevent actuation thereof, and a control element connected with said counting disc for pivoting said locking arm to effect locking of the release member when the counting disc has reached a pre-selected rotational position, said toothed element having a gap on the periphery thereof where there are no teeth, whereby on rotation of said counting disc to a set position according to the use of long lengths of film, the gap is brought adjacent the pawl and the counting disc remains stationary on continued reciprocation of the slider.

References Cited in the file of this patent

FOREIGN PATENTS 1,096,185     Germany _____ Dec. 29, 1960